United States Patent
Kunimatsu et al.

(10) Patent No.: US 6,938,149 B2
(45) Date of Patent: Aug. 30, 2005

(54) RENAMING APPARATUS AND PROCESSOR

(75) Inventors: Atsushi Kunimatsu, Kawasaki (JP);
Yukio Watanabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 687 days.

(21) Appl. No.: 09/962,197

(22) Filed: Sep. 26, 2001

(65) Prior Publication Data
US 2002/0042872 A1 Apr. 11, 2002

(30) Foreign Application Priority Data

Sep. 28, 2000 (JP) ........................................ 2000-297242
Mar. 30, 2001 (JP) ........................................ 2001-101216

(51) Int. Cl.⁷ .............................................. G06F 9/34
(52) U.S. Cl. ..................................................... 712/217
(58) Field of Search ........................ 712/217, 23, 211; 711/209, 214, 202, 203

(56) References Cited

U.S. PATENT DOCUMENTS

| | | | |
|---|---|---|---|
| 5,872,989 A | | 2/1999 | Tsushima et al. .............. 712/23 |
| 5,974,525 A | * | 10/1999 | Lin et al. ....................... 712/23 |
| 6,003,126 A | * | 12/1999 | Huynh et al. ................. 712/217 |
| 6,009,509 A | * | 12/1999 | Leung et al. ................. 712/202 |
| 6,049,839 A | * | 4/2000 | Fujii et al. ....................... 710/1 |
| 6,094,716 A | | 7/2000 | Witt .............................. 712/23 |
| 6,167,497 A | * | 12/2000 | Nakatsuka et al. .......... 711/202 |
| 6,330,661 B1 | * | 12/2001 | Torii ............................ 712/228 |

FOREIGN PATENT DOCUMENTS

| | | |
|---|---|---|
| JP | 6-214784 | 8/1994 |
| JP | 10-97423 | 4/1998 |
| KR | 0118472 | 3/1997 |
| WO | WO 00/07097 | 2/2000 |

* cited by examiner

*Primary Examiner*—Eric Coleman
(74) *Attorney, Agent, or Firm*—Oblon, Spivak, McClelland, Maier & Neustadt, P.C.

(57) ABSTRACT

A renaming apparatus configured to set a correspondence between a physical register number and a logical register number. The apparatus includes a control register configured to store the correspondence between the physical register number and the logical register number and a control register setting part configured to set the control register in accordance with the content of an instruction, when an instruction for setting the correspondence between the physical register number and the logical register number is included in the issued string of instructions.

12 Claims, 16 Drawing Sheets

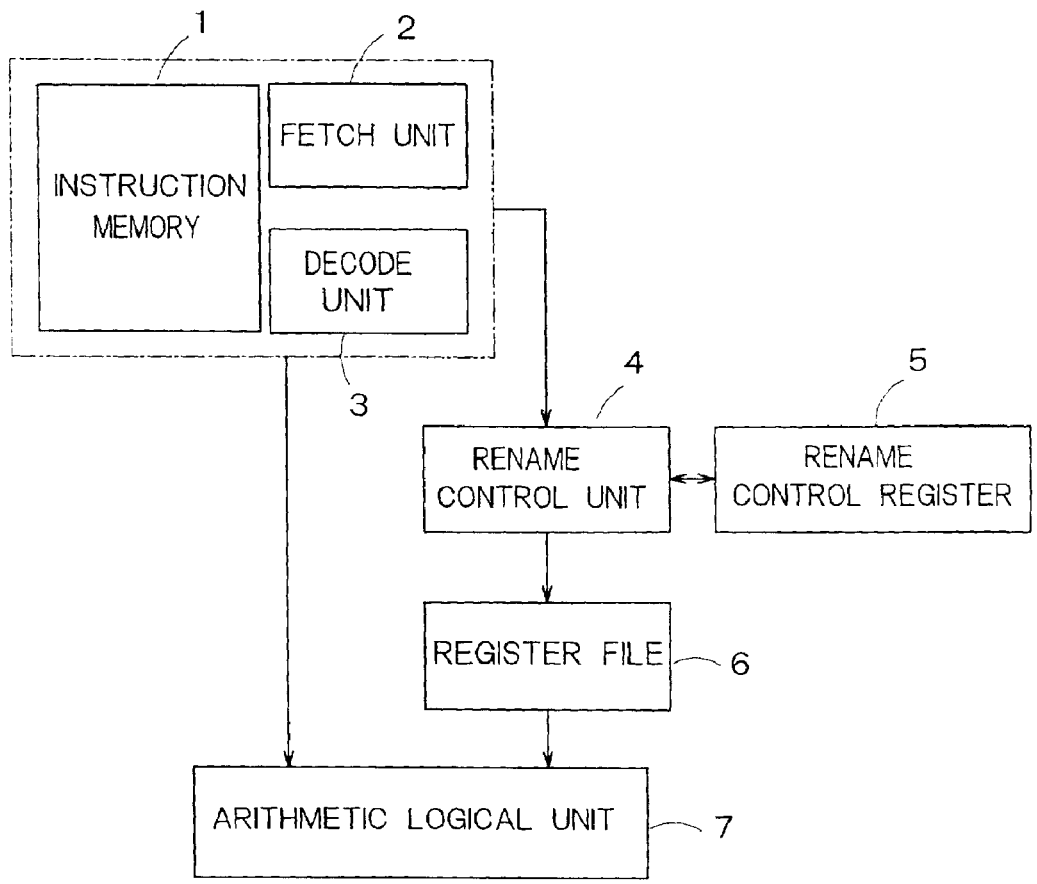
F I G. 1
| F | D | E | M | W |
F... Instruction Fetch
D... Instruction Decode
E... Execute
M... Memory access
W... Write back
F I G. 2

(A)

[ARITHMETIC LOGICAL INSTRUCTIONS]
```
ADD    dest, src1, src2    ;dest← src1 + src2
SUB    dest, src1, src2    ;dest← src1 − src2
MUL    dest, src1, src2    ;dest← src1 * src2
AND    dest, src1, src2    ;dest← src1 and src2
OR     dest, src1, src2    ;dest← src1 or src2
XOR    dest, src1, src2    ;dest← src1 x or src2
NOT    dest, src1          ;dest← not src1
ROTL   dest, src1, src2    ;ROTATE dest← src1 LEFTWARDS BY scr2 bit
ROTR   dest, src1, src2    ;ROTATE dest← src1 CLOCKWISE BY scr2 bit
SHFTL  dest, src1, src2    ;SHIFT dest← src1 LEFTWARDS BY scr2 bit
SHFTR  dest, src1, src2    ;SHIFT dest← src1 RIGHTWARDS BY scr2 bit
```

(B)

[LOAD/STORE INSTRUCTION]
```
LOAD   dest, imm(src1)
              ;LOAD FROM ADDRESS src1 REGISTER VALUE+imm
STORE  dest, imm(src1)
              ;STORE IN ADDRESS OF src1 REGISTER VALUE+imm
```

(C)

[CONDITION BRANCH INSTRUCTION]
```
BEQZ   src1, label    ;BRANCH WHEN src1 IS EQUAL TO 0
BGTZ   src1, label    ;BRANCH WHEN src1 IS LARGER THAN 0
BLTZ   src1, label    ;BRANCH WHEN src1 IS SMALLER THAN 0
```

(D)

[REGISTER RENAME INSTRUCTION]
```
(1)STORE_REN   src1        ;SET CONTENT OF src1 IN destination RCR
                            (RENAME CONTROL REGISTER)

(2)LOAD_REN    src1        ;SET CONTENT OF destination RCR IN src1

(3)ROTATE      bit, from, to,  ;ROTATE SOURCE RCR TO "to" BIT FROM "from"
                                BIT OF source RCR LEFTWARDS BY NUMBER
                                OF BITS SEE FIG. 8-13

(4)RENAME                  ;COPY CONTENT OF destination RCR INTO
                            effective RCR AND source RCR
```

FIG. 3

OPERATION OF ROTATE INSTRUCTION rotate [bit], [from], [to]

ex: rotate 2, 4, c

OPERATION EXAMPLE OF ROTATE INSTRUCTION rotate 1, 0, f : ROTATE ALL OF 64BITS LEFTWARDS BY 4BITS rotate 2, 0, f : ROTATE ALL OF 64BITS LEFTWARDS BY 8BITS

OPERATION EXAMPLE OF ROTATE INSTRUCTION rotate 4, 0, f : ROTATE ALL OF 64BITS LEFTWARDS BY 16BITS rotate 8, 0, f : ROTATE ALL OF 64BITS LEFTWARDS BY 32BITS

OPERATION EXAMPLE OF ROTATE INSTRUCTION rotate 1, 8, f : ROTATE UPPER-HALF 32BITS LEFTWARDS BY 4BITS rotate 2, 8, f : ROTATE UPPER-HALF 32BITS LEFTWARDS BY 8BITS

OPERATION EXAMPLE OF ROTATE INSTRUCTION rotate 2, 8, f : ROTATE UPPER-HALF 32BITS LEFTWARDS BY 8BITS

FIG. 10A rotate 1, 8, b : ROTATE FROM 8-TH BUNDLE TO B-TH BUNDLE LEFTWARDS BY 4BITS

FIG. 10B

OPERATION EXAMPLE OF ROTATE INSTRUCTION rotate 1, 8, b : ROTATE FROM 8-TH BUNDLE TO B-TH BUNDLE LEFTWARDS BY 4BITS

FIG. 11A rotate 1, a, b : ROTATE FROM A-TH BUNDLE TO B-TH BUNDLE LEFTWARDS BY 4BITS

FIG. 11B

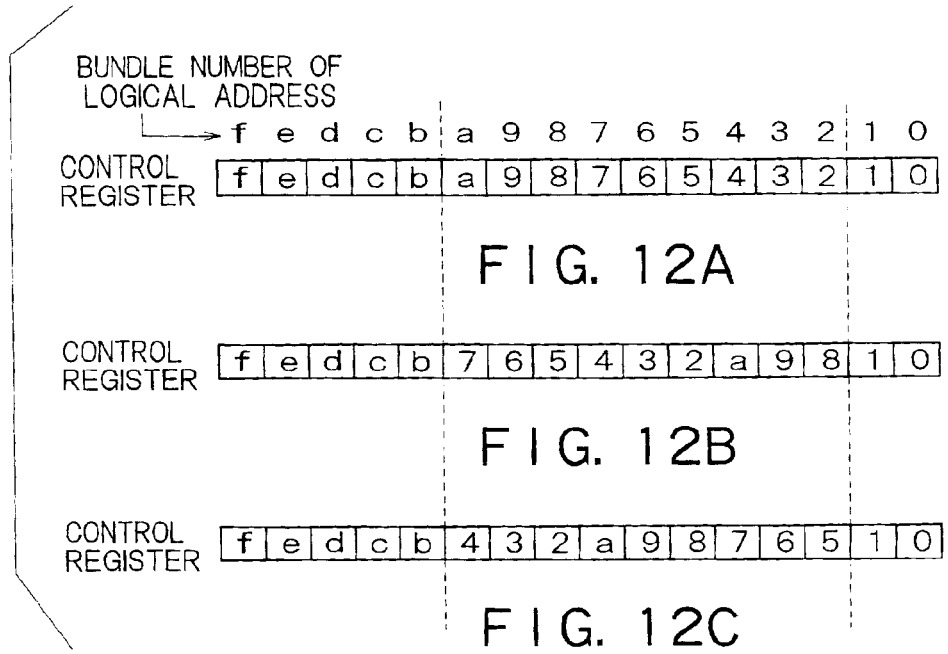
FIG. 12A
FIG. 12B
FIG. 12C
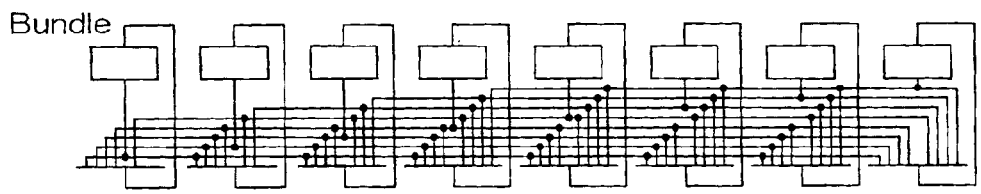
FIG. 13
FIG. 14

BUNDLE NUMBER OF
LOGICAL ADDRESS

Shift=3, From=3, To=b

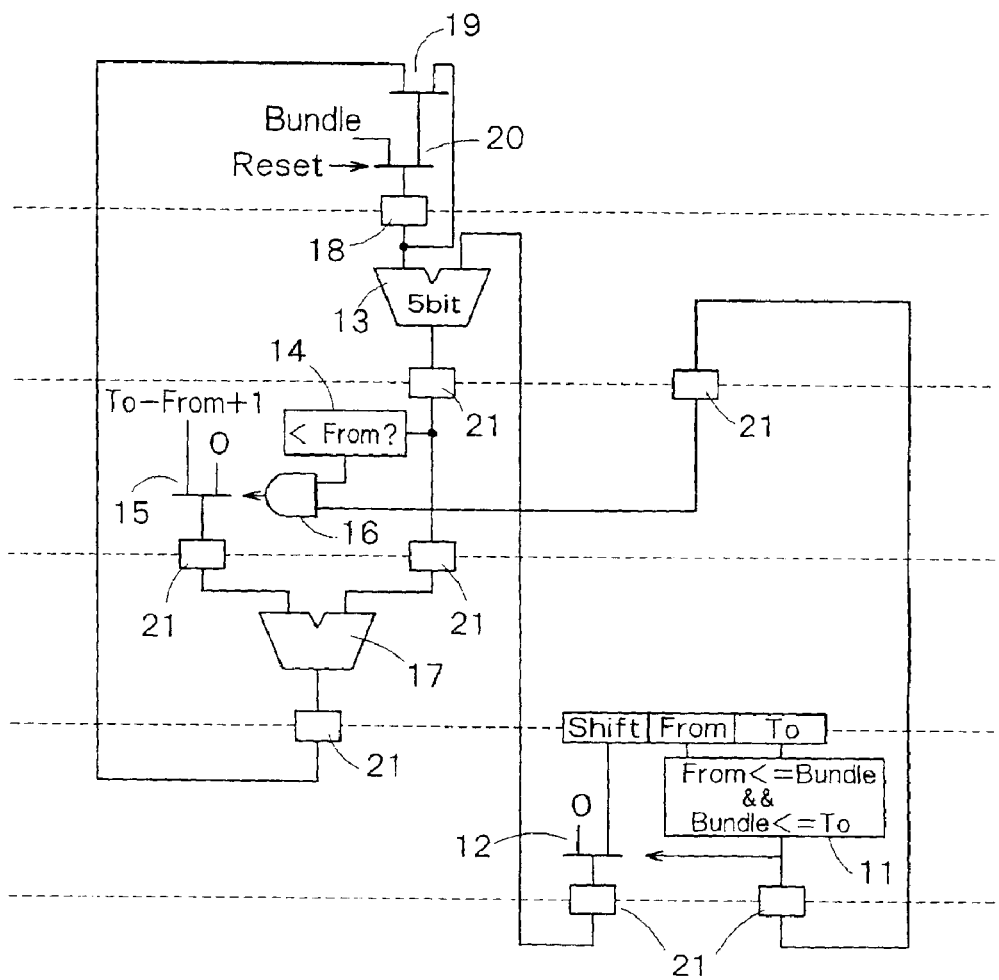
F I G. 17

| F | D | E | M | W |

F... Instruction Fetch
D... Instruction Decode
E... Execute
M... Memory access
W... Write back

INSTRUCTION 1   load r1, (a1++)   ; LOAD DATA FROM ADDRESS INDICATED BY REGISTER a1, STORE DATA IN r1, INCREASE REGISTER a1 BY 1

INSTRUCTION 2   load r2, (a2++)   ; LOAD DATA FROM ADDRESS INDICATED BY REGISTER a2, STORE DATA IN r2, INCREASE REGISTER a2 BY 1

INSTRUCTION 3   add r3, r1, r2    ; ADD r1 AND r2, STORE RESULT IN r3

INSTRUCTION 4   store r3, (a3++)  ; STORE CONTENT OF REGISTER r3 IN ADDRESS INDICATED BY REGISTER a3, INCREASE REGISTER a3 BY 1

INSTRUCTION 5   branch loop;      ; INFINITE LOOP

FIG. 19
PRIOR ART

| cycle | 0 1 2 3 4 5 6 7 8 9 10 11 12 13 14 |
|---|---|
| INSTRUCTION 1 | \|F\|D\|E\|M\|Wa\| |
| INSTRUCTION 2 |    \|F\|D\|E\|M\|Wa\| |
| INSTRUCTION 3 |    * * *\|F\|Dc\|E\|M\|Wa\| |
| INSTRUCTION 4 |       * * *\|F\|De\|E\|M\|W\| |
| INSTRUCTION 5 |          \|F\|D\|E\|M\|W\| |

FIG. 20
PRIOR ART

| | |
|---|---|
| INSTRUCTION 1 OF LOOP1 | \|F\|D\|E\|M\|Wa\| |
| INSTRUCTION 2 OF LOOP1 |  \|F\|D\|E\|M\|Wb\| |
| INSTRUCTION 1 OF LOOP2 |   \|F\|D\|E\|M\|W\| |
| INSTRUCTION 2 OF LOOP2 |    \|F\|D\|E\|M\|W\| |
| INSTRUCTION 1 OF LOOP3 |     \|F\|D\|E\|M\|W\| |
| INSTRUCTION 2 OF LOOP3 |      \|F\|D\|E\|M\|W\| |
| INSTRUCTION 3 OF LOOP1 |       \|F\|D\|E\|M\|W\| |
| INSTRUCTION 3 OF LOOP2 |        \|F\|D\|E\|M\|W\| |
| INSTRUCTION 3 OF LOOP3 |         \|F\|D\|E\|M\|W\| |
| INSTRUCTION 4 OF LOOP1 |          \|F\|D\|E\|M\|W\| |
| INSTRUCTION 4 OF LOOP2 |           \|F\|D\|E\|M\|W\| |
| INSTRUCTION 4 OF LOOP3 |            \|F\|D\|E\|M\|W\| |
| INSTRUCTION 5 OF LOOP1 |             \|F\|D\|E\|M\|W\| |
| INSTRUCTION 5 OF LOOP2 |              \|F\|D\|E\|M\|W\| |
| INSTRUCTION 5 OF LOOP3 |               \|F\|D\|E\|M\|W\| |

NUMBER OF BUBBLES IS 1, INSTRUCTION EXECUTION THROUGH PUT PER CLOCK IS 0.93 INSTRUCTION

FIG. 21
PRIOR ART loop:
    INSTRUCTION 1 OF LOOP 1        load r1, (a1++)
    INSTRUCTION 2 OF LOOP 1        load r2, (a2++)
    INSTRUCTION 1 OF LOOP 2        load r3, (a3++)
    INSTRUCTION 2 OF LOOP 2        load r4, (a4++)
    INSTRUCTION 1 OF LOOP 3        load r5, (a5++)
    INSTRUCTION 2 OF LOOP 3        load r6, (a6++)
    INSTRUCTION 3 OF LOOP 1        add r7, r1, r2
    INSTRUCTION 3 OF LOOP 2        add r8, r3, r4
    INSTRUCTION 3 OF LOOP 3        add r9, r5, r6
    INSTRUCTION 4 OF LOOP 1        store r7, (a7++)
    INSTRUCTION 4 OF LOOP 2        store r8, (a8++)
    INSTRUCTION 4 OF LOOP 3        store r9, (a9++)
    INSTRUCTION 5                   branch １oop:

F I G. 22
PRIOR ART

| PHYSICAL REGISTER NUMBER | LOGICAL REGISTER NUMBER | COMMENT |
|---|---|---|
| ---------- REGISTER FOR PHASE 1 ---------- | | |
| pr1 | r1 | CORRESPONDING TO r1 OF PROGRAM 1 |
| pr2 | r2 | CORRESPONDING TO r2 OF PROGRAM 1 |
| pr3 | r3 | CORRESPONDING TO r3 OF PROGRAM 1 |
| ---------- REGISTER FOR PHASE 2 ---------- | | |
| pr4 | r4 | CORRESPONDING TO r1 OF PROGRAM 1 |
| pr5 | r5 | CORRESPONDING TO r2 OF PROGRAM 1 |
| pr6 | r6 | CORRESPONDING TO r3 OF PROGRAM 1 |
| ---------- REGISTER FOR PHASE 3 ---------- | | |
| pr7 | r7 | CORRESPONDING TO r1 OF PROGRAM 1 |
| pr8 | r8 | CORRESPONDING TO r2 OF PROGRAM 1 |
| pr9 | r9 | CORRESPONDING TO r3 OF PROGRAM 1 |

F I G. 23
PRIOR ART loop:
   INSTRUCTION 1    load r1, (a1++)    ; INSTRUCTION HAVING MEANING IN PHASE 1
   INSTRUCTION 2    load r2, (a2++)    ; INSTRUCTION HAVING MEANING IN PHASE 1
   INSTRUCTION 3    add r6, r4, r5     ; INSTRUCTION HAVING MEANING IN PHASE 2
   INSTRUCTION 4    store r9, (a3++)   ; INSTRUCTION HAVING MEANING IN PHASE 3
   INSTRUCTION 5    branch_regrot loop:; INSTRUCTION HAVING MEANING IN PHASE 1

FIG. 24
PRIOR ART

```
-------- LOOP 1 --------------
INSTRUCTION 1  |F|D|E|M|Wa|
INSTRUCTION 2     |F|D|E|M|Wb|
INSTRUCTION 3        |F|D|E|M|W|
INSTRUCTION 4           |F|D|E|M|W|
INSTRUCTION 5              |F|D|E|M|W|
-------- LOOP 2 --------------
INSTRUCTION 1                 |F|D|E|M|W|
INSTRUCTION 2                    |F|D|E|M|W|
INSTRUCTION 3                       |Fc|D|E|M|Wd|
INSTRUCTION 4                          |F|D|E|M|W|
INSTRUCTION 5                             |F|D|E|M|W| ; REGISTER ROTATE
-------- LOOP 3 --------------
INSTRUCTION 1                                |F|D|E|M|W|       STORE DATA
INSTRUCTION 2                                   |F|D|E|M|W|    OF r9(pr3)
INSTRUCTION 3                                      |F|D|E|M|W|     )
INSTRUCTION 4                                         |Fe|D|E|M|W| ;/

INSTRUCTION 5                                            |F|D|E|M|W| ;\
                                                                       )
                                                                 REGISTER
                                                                 ROTATE
```

FIG. 25
PRIOR ART

| PHYSICAL REGISTER NUMBER | LOGICAL REGISTER NUMBER | COMMENT |
|---|---|---|
| --------- REGISTER FOR PHASE 1 --------------------- | | |
| pr7 | r1 | CORRESPONDING TO r1 OF PROGRAM 1 |
| pr8 | r2 | CORRESPONDING TO r2 OF PROGRAM 1 |
| pr9 | r3 | CORRESPONDING TO r3 OF PROGRAM 1 |
| --------- REGISTER FOR PHASE 2 --------------------- | | |
| pr1 | r4 | CORRESPONDING TO r1 OF PROGRAM 1 |
| pr2 | r5 | CORRESPONDING TO r2 OF PROGRAM 1 |
| pr3 | r6 | CORRESPONDING TO r3 OF PROGRAM 1 |
| --------- REGISTER FOR PHASE 3 --------------------- | | |
| pr4 | r7 | CORRESPONDING TO r1 OF PROGRAM 1 |
| pr5 | r8 | CORRESPONDING TO r2 OF PROGRAM 1 |
| pr6 | r9 | CORRESPONDING TO r3 OF PROGRAM 1 |

FIG. 26
PRIOR ART

| PHYSICAL REGISTER NUMBER | LOGICAL REGISTER NUMBER | COMMENT |
|---|---|---|
| --------- REGISTER FOR PHASE 1 --------------------- | | |
| pr4 | r1 | CORRESPONDING TO r1 OF PROGRAM 1 |
| pr5 | r2 | CORRESPONDING TO r2 OF PROGRAM 1 |
| pr6 | r3 | CORRESPONDING TO r3 OF PROGRAM 1 |
| --------- REGISTER FOR PHASE 2 --------------------- | | |
| pr7 | r4 | CORRESPONDING TO r1 OF PROGRAM 1 |
| pr8 | r5 | CORRESPONDING TO r2 OF PROGRAM 1 |
| pr9 | r6 | CORRESPONDING TO r3 OF PROGRAM 1 |
| --------- REGISTER FOR PHASE 3 --------------------- | | |
| pr1 | r7 | CORRESPONDING TO r1 OF PROGRAM 1 |
| pr2 | r8 | CORRESPONDING TO r2 OF PROGRAM 1 |
| pr3 | r9 | CORRESPONDING TO r3 OF PROGRAM 1 |

FIG. 27
PRIOR ART

RENAMING APPARATUS AND PROCESSOR

CROSS REFERENCE TO RELATED APPLICATIONS

This application claims benefit of priority under 35 U.S.C. §119 to Japanese Patent Application No. 2000-297242 filed on Sep. 28, 2000 and Japanese Patent Application No. 2001-101216 filed on Mar. 30, 2001, the entire contents of which are incorporated by reference herein.

BACKGROUND OF THE INVENTION

1. Field of the Invention

The present invention relates to a renaming apparatus for setting a correspondence between a physical register number and a logical register number, and a processor in which a high-frequency operation is required, such as a microprocessor and a digital signal processor (DSP).

2. Related Background Art

When a frequency of a processor is raised in order to obtain a high performance, the number of pipeline stages inevitably increases, and a pipeline bubble (pipeline stall) increases. Software pipelining is generally performed in order to remove the bubble.

FIG. 18 is a diagram showing a pipeline stage of a certain processor, and FIG. 19 is a diagram showing one example of a program executed by the processor of FIG. 18.

It is assumed that during execution of the program of FIG. 19 by the processor of FIG. 18, there is no data bypass, and data can be read in a stage D after writing of the data into a register in a stage W.

The processor has an interlock function of one issue and can execute a pipeline processing. This processor executes the program of FIG. 19 in accordance with a procedure shown in FIG. 20. The data is written into a register r1 in Wa (fifth cycle) of instruction 1, and written into a register r2 in Wb (sixth cycle) of instruction 2. For instruction 3, the data of the registers r1, r2 are read in a stage Dc, and the processor is interlocked (stalled) for three cycles. This is a pipeline bubble due to dependence on data, and the bubble is denoted with "*" in FIG. 20. In an example of FIG. 20, there are six pipeline bubbles.

Similarly, the data written into a register r3 in a stage Wd of instruction 3 is read in a stage De of instruction 4. Instruction 5 is simply a branch instruction. This instruction, which has no dependence on other instructions, is soon executed in the next cycle.

Additionally, for simplicity, it is assumed in FIG. 20 that the branch instruction of a loop has no penalty (no branch delay slot), and the address of a load/store instruction can be incremented in one system.

To solve the pipeline bubble shown in FIG. 20, overlap execution of each loop is performed. FIG. 21 is a diagram showing one example of the overlap execution. In an example of FIG. 21, only one pipeline bubble is generated in three loops. In the example of FIG. 20, six pipeline bubbles per loop are generated. Therefore, the number of bubbles can drastically be decreased to ⅙.

To raise efficiency of instruction throughput, a programmer primitively constructs and realizes software pipelining. The program is shown, for example, in FIG. 22.

In an example of FIG. 22, registers r1, r2, r7, a1, a2, a7 are used in loop 1, registers r3, r4, r8, a3, a4, a8 are used in loop 2, and registers r5, r6, r9, a5, a6, a9 are used in loop 3.

As described above, in the example of FIG. 22, since different registers are used in the respective loops, the number of instructions of the program is tripled. Moreover, the programmer has to designate the registers in such a manner that the same register is not conflicted in the respective overlapped loops.

The following two conventional techniques for solving this intricacy have been proposed. A first technique is a processor which has an out-of-order issue function and automatic register renaming function. In this processor, an ideal operation is performed as shown in FIG. 21, in accordance with program description of FIG. 19 as it is. However, there is a problem that scale of hardware for realizing the out-of-order issue function becomes enormous.

A second technique is a register rotation function mounted in a computer Itanium or Cydrome of Intel K.K. An example of FIG. 22 is realized in register rotation as shown in FIG. 23.

With an instruction branch_regrot, a jump instruction of the loop is executed, and simultaneously the registers are rotated. In the rotation, every three registers are replaced. The program is shown in FIG. 24, and pipeline operation is shown in FIG. 25.

A correspondence of the registers at the time when a first loop is finished is shown in FIG. 26. Moreover, the correspondence of the registers at the time when a second loop is finished is shown in FIG. 27.

A conventional automatic renaming function has a problem that hardware is complicated. Moreover, a conventional register rotation function has a low flexibility, and has a problem that the function cannot be applied to rotations other than a simple rotation.

SUMMARY OF THE INVENTION

A renaming apparatus configured to set a correspondence between a physical register number and a logical register number, said apparatus comprising:

a control register configured to store the correspondence between the physical register number and the logical register number; and a control register setting part configured to set said control register in accordance with the content of an instruction, when an instruction for setting the correspondence between the physical register number and the logical register number is included in the issued string of instructions.

BRIEF DESCRIPTION OF THE DRAWINGS

FIG. 1 is a block diagram showing a schematic constitution of a processor according to the present invention.

FIG. 2 is a diagram showing an example in which a pipeline processing is performed in five stages.

FIG. 3 is a diagram showing one example of an instruction set.

FIG. 10 is a diagram showing an operation example of the ROTATE instruction.

FIG. 11 is a diagram showing an operation example of the ROTATE instruction.

FIG. 12 is a diagram showing a rotation operation, when From=2, To=a, Shift=3 are designated by a register rename instruction.

FIG. 13 is a diagram showing an actually accessed physical address.

FIG. 14 is a diagram showing an example of a data path in which the number of bundles is "8".

FIG. 17 is a block diagram showing an operation state of the renaming apparatus for allowing the processor to perform a pipeline operation.

FIG. 18 is a diagram showing a pipeline stage of a certain processor.

FIG. 19 is a diagram showing one example of a program executed by the processor of FIG. 18.

FIG. 20 is a diagram showing the pipeline operation of FIG. 19.

FIG. 21 is a diagram showing one example of overlap execution.

FIG. 22 is a diagram showing one example of a program for performing software pipelining.

FIG. 23 is a diagram showing one example of register rotation.

FIG. 24 is a diagram showing a program corresponding to FIG. 23.

FIG. 25 is a diagram showing the pipeline operation of FIG. 24.

FIG. 26 is a diagram showing a correspondence between registers at the end of a first loop.

FIG. 27 is a diagram showing the correspondence between the registers at the end of a second loop.

DESCRIPTION OF THE PREFERRED EMBODIMENTS

Figure 4:
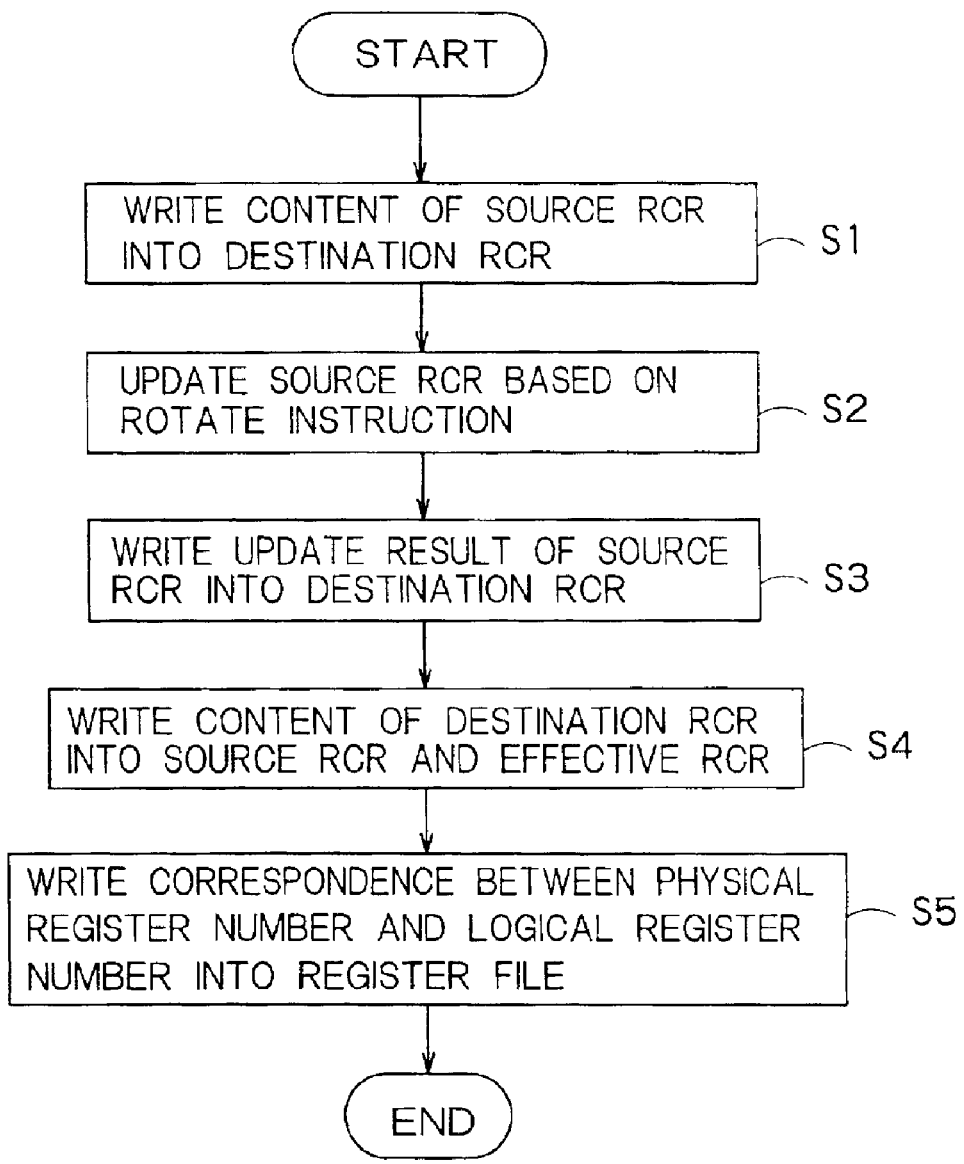
FIG. 4 is a flowchart showing a processing operation of a rename control unit 4 for executing a RENAME instruction.

A processor and a renaming apparatus according to the present invention will more specifically be described hereinafter with reference to the drawings.

(First Embodiment)

FIG. 1 is a block diagram showing a schematic constitution of one embodiment of the processor according to the present invention. The processor of FIG. 1 includes: an instruction memory 1 for storing an instruction string; a fetch unit 2 for fetching an instruction from the instruction memory 1; a decode unit 3 for decoding the fetched instruction; a rename control unit (RCU) 4 for executing a rename instruction as described later; a rename control register (RCR) 5; a register file 6 for storing a correspondence between a physical address and a logical address; and an arithmetic logical unit (ALUs) 7 for executing a decoded instruction.

In the present embodiment, 256 registers are divided into a plurality of bundles (banks) of every 16 registers, and a correspondence is established between a physical register number and a logical register number by a unit of the bank.

To establish the correspondence, the rename control register 5 is utilized. The rename control register 5 includes a source register (source RCR, first register section), a destination register (destination RCR, second register section), and an effective register (effective RCR, third register section).

As shown in FIG. 2, the processor of the present embodiment performs a pipeline processing in five stages. Moreover, the processor has arithmetic logical instructions shown in FIG. 3A, load/store instructions shown in FIG. 3B, condition branch instructions shown in FIG. 3C, and additionally register rename instructions shown in FIG. 3D as an instruction set.

The register rename instructions are dedicated instructions for setting the rename control register 5, and is composed of four instructions (1) to (4): (1) STORE_REN is an instruction for setting the content of general-purpose register src1 to the destination RCR; (2) LOAD_REN is an instruction for setting the content of the destination RCR to the general-purpose register src1; (3) ROTATE is an instruction for rotating the register leftwards (leftwards) to a "to" bit from a "from" bit of the source RCR by the number of bits, as described later; and (4) RENAME is an instruction for copying the content of the destination RCR to the effective RCR and source RCR.

The rename control unit 4 of FIG. 1 sets the rename control register 5 when the register rename instruction shown in FIG. 3D is issued. FIG. 4 is a flowchart showing a processing operation of the rename control unit 4 for executing the RENAME instruction. First, the rename control unit 4 writes the content of the source RCR into the destination RCR (step S1).

Subsequently, the source RCR is updated based on the ROTATE instruction (step S2). An update result of the source RCR is next written into the destination RCR (step S3).

Subsequently, the content of the destination RCR is written into the source RCR and effective RCR (step S4). The correspondence between the physical register number and the logical register number is next written into the register file 6 based on the content of the effective RCR (step S5).

As described above, the correspondence between the logical register number and the physical register number is detected by referring to the effective RCR. Therefore, while the effective RCR is referred to, the source RCR and destination RCR can be utilized for an operation for performing the next rename processing and so on.

Figure 5:
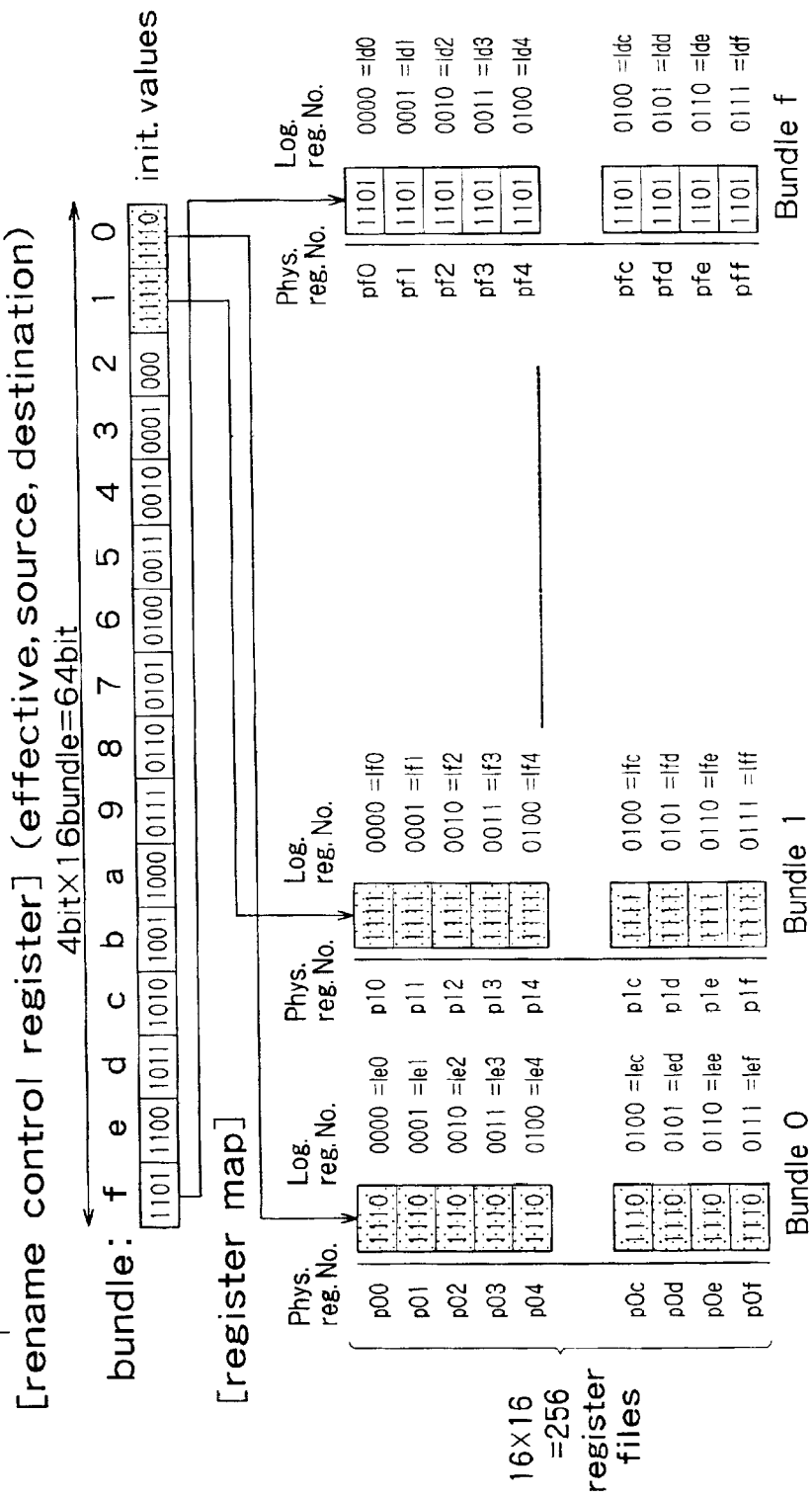
FIG. 5 is an explanatory view of a procedure for executing the RENAME instruction.

FIG. 5 is an explanatory view of a procedure for executing the RENAME instruction. In this shown example, the rename control register 5 associates a field (management area) of the logical register number with the physical register number with respect to each of 16 bundles. More specifically, 16 logical register numbers E0 to EF belonging to bundle 0 are associated with physical register numbers 00 to 0F, 16 logical register numbers F0 to FF belonging to bundle 1 are associated with physical register numbers 10 to 1F, subsequently the associating is successively performed, and 16 logical register numbers D0 to DF belonging to bundle f are associated with physical register numbers F0 to FF.

The register file 6 has a capacity of 16×16=256 bits, and stores the correspondence between the physical register number and the logical register number for each of the 16 bundles of the rename control register 5.

Figure 6:
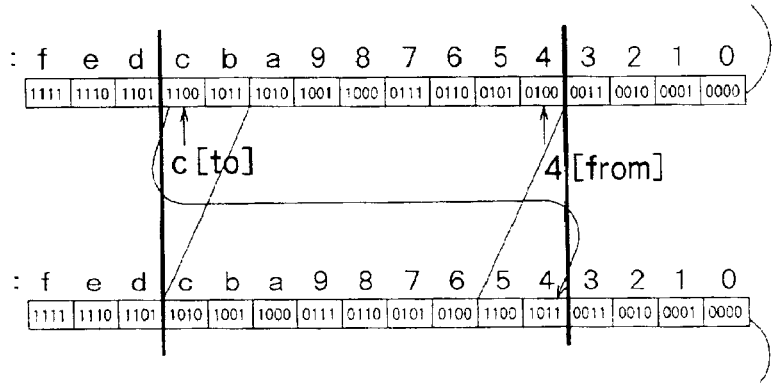
FIG. 6 is a diagram showing an operation example of a ROTATE instruction.

FIG. 6 is a diagram showing an operation example of the ROTATE instruction. In this example, every two bundles are rotated leftwards to a c-th bundle from a fourth bundle.

Figure 7A:
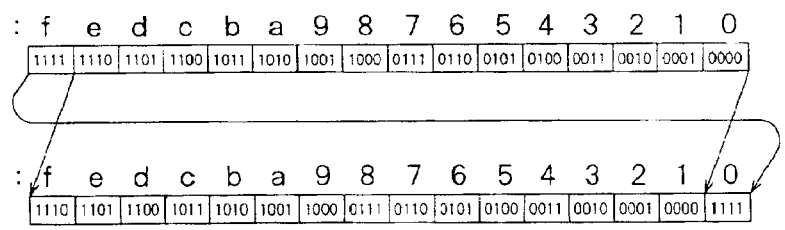
FIG. 7 is a diagram showing an operation example of the ROTATE instruction.
Figure 7B:
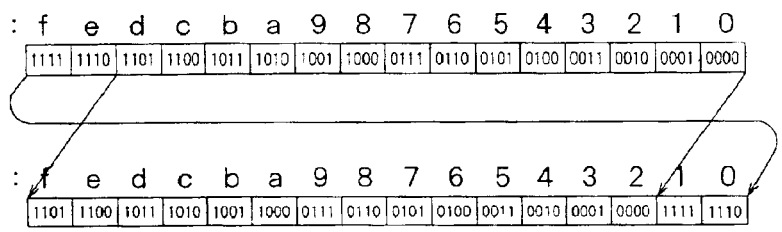

Moreover, FIG. 7A shows an example in which each of all bundles is rotated leftwards, and FIG. 7B shows an example in which every two bundles of all the bundles are rotated leftwards.

Figure 8A:
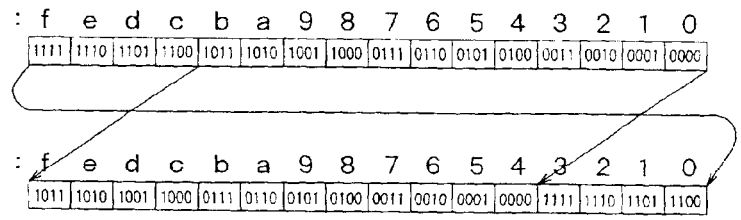
FIG. 8 is a diagram showing an operation example of the ROTATE instruction.
Figure 8B:
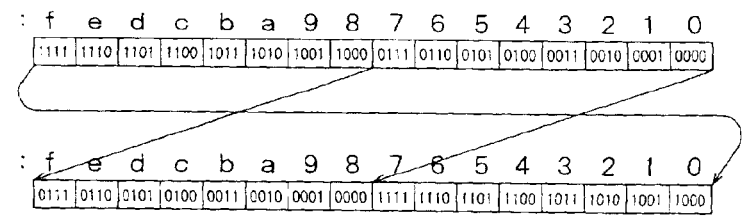

Furthermore, FIG. 8A shows an example in which every four bundles of all bundles are rotated leftwards, and FIG. 8B shows an example in which every eight bundles of all the bundles are rotated leftwards.

Figure 9A:
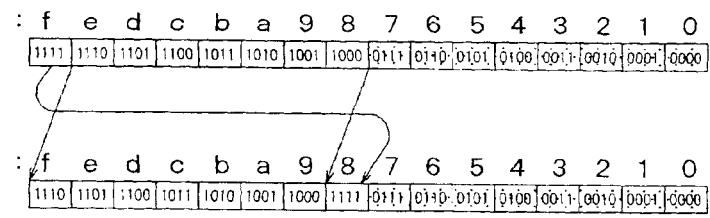
FIG. 9 is a diagram showing an operation example of the ROTATE instruction.
Figure 9B:
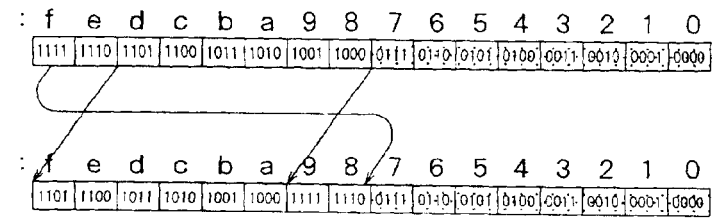

Additionally, FIG. 9A shows an example in which every bundle of upper eight bundles is rotated leftwards, and FIG. 9B shows an example in which every two bundles of the upper eight bundles are rotated leftwards.

Moreover, FIG. 10A shows an example in which every four bundles of the upper eight bundles are rotated leftwards, and FIG. 10B shows an example in which every bundle is rotated leftwards to a b-th bundle from the eighth bundle.

Furthermore, FIG. 11A shows an example in which every bundle is rotated leftwards to the b-th bundle from the eighth bundle, and FIG. 11B shows an example in which every bundle is rotated leftwards to the b-th bundle from the a-th bundle.

As described above, in the present embodiment, the correspondence between the physical register number and the logical register number can be designated for each bundle with respect to arbitrary bundles using the register rename instruction as the dedicated instruction for designating the correspondence between the physical register number and the logical register number. Therefore, the physical register number can be selected so that a pipeline babble is not generated, and as a result a processing speed of the processor can be enhanced.

Moreover, the concrete content of the register rename instruction can arbitrarily be designated by a programmer, and the rename processing can therefore be performed if necessary.

Furthermore, in the present embodiment, the source RCR, destination RCR and effective RCR are disposed as the control registers, and a rotated result is written into both the source RCR and the effective RCR. The content of the effective RCR is referred to, and the physical register number is associated with the logical register number. During this time, the source RCR and destination RCR can be utilized for other operations such as the next rotation processing. Therefore, a processing efficiency is enhanced.

In the first embodiment, the example in which the field corresponding to each bundle of the logical register is disposed in the rename control register 5 has been described. Conversely, the field corresponding to each bundle of the physical register may be disposed in the rename control register 5, and the rename control unit 4 may set the bundle number of the logical register.

(Second Embodiment)

FIG. 12 shows a rotation operation, in case that From=2, To=a, Shift=3 are designated by the aforementioned register rename instruction, and FIG. 12A shows an initial value of the bundle. When the bundle is rotated as shown in FIG. 12A, the content of bundles with bundle numbers "2" to "a" shifts leftwards by every "3" bundles. The bundle stuck out of a left end of a shift range is successively inputted to a right end of the shift range.

As a result, a state of FIG. 12B is obtained. When similar rotation is performed from this state, a state of FIG. 12C is obtained. Furthermore, when the similar rotation is performed, the state returns to FIG. 12A.

For example, in a program in which the register having a logical number 3c (3 denotes a bundle number, c denotes a register number) is accessed, the actually accessed physical address changes as shown in FIG. 13. That is, after a first rotation, the program accesses the register of a physical address 9c. After a second rotation, the program accesses the register of a physical address 6c, and then, after a third rotation, accesses the register of a physical address 3c.

As described above, so-called software pipelining is performed. In the software pipelining, even when the same logical address is designated in the program, different physical address is actually used.

For the aforementioned register rename instruction, the type and range of the bundles to be rotated can arbitrarily be designated. Because of this, when the register rename processing is composed of hardware, it is necessary to dispose a path for transferring data to all bundles which can be movement destinations by rotation.

FIG. 14 shows an example of the data path in which the number of bundles is "8". The data path is a wiring extending over the bundles. These wirings are connected to a multiplexer, necessary bundle data is finally selected by the multiplexer, and the bundle is updated.

When the wirings are extended over the bundles as shown in FIG. 14, a wiring area increases. There is a possibility that speed is deteriorated with the increase of a wiring length. Particularly, when the number of bundles increases, the wiring area is proportional to square of the number of bundles. Therefore, the problem becomes serious.

To solve the problem, in the following second embodiment, the rotation of the register number by the register rename instruction is realized by hardware which has a simple constitution.

Figure 15:
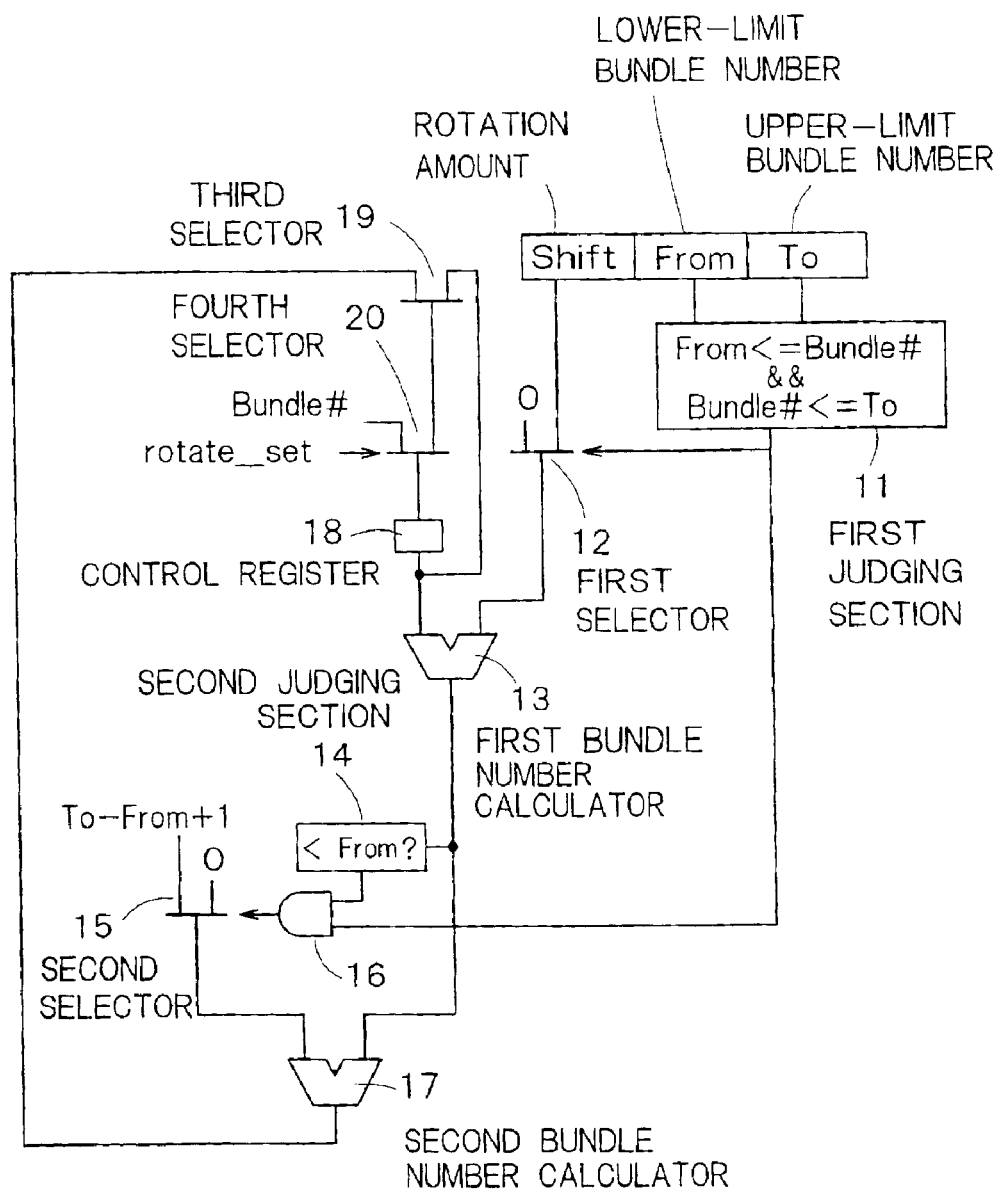
FIG. 15 is a block diagram of one embodiment of a renaming apparatus according to the present invention.

FIG. 15 is a block diagram of one embodiment of the renaming apparatus according to the present invention. The renaming apparatus of FIG. 15 is disposed for each bundle. For example, when there are 16 bundles, 16 renaming apparatuses shown in FIG. 16 are disposed. These renaming apparatuses are incorporated, for example, in the processor.

The renaming apparatus of FIG. 15 includes: a first judging section (first judging part) 11 for judging whether or not a predetermined original bundle number is included between a lower-limit bundle number and an upper-limit bundle number indicated by the register rename instruction; a first selector (first selector) 12 for setting a rotation amount of the bundle based on a judgment result of the first judging section 11; a first bundle number calculator (first bundle number calculator) 13 for calculating a new bundle number corresponding to the original bundle number; a second judging section (second judging part) 14 for judging whether or not the calculated new bundle number is smaller than the lower-limit bundle number indicated by the register rename instruction; a second selector (second selector) 15 for selecting a correction value of the bundle number based on a judgment result of the second judging section 14; an AND circuit 16 for controlling selection of the second selector 15; a second bundle number calculator (second bundle number calculator) 17 for adding the bundle number calculated by the bundle number calculator and the correction value selected by the second selector (second selector) 15 to obtain a final bundle number; a third selector (third selector) 19 for selecting either one from the bundle number calculated by the first bundle number calculator 13 and the bundle number stored in a control register 18; and a fourth selector (reset part) 20 for selecting a final bundle number to be stored in the control register 18.

When the original bundle number is between the lower-limit bundle number and the upper-limit bundle number of the register rename instruction, the first selector 12 selects and outputs a rotation amount of the register rename instruction. When the inputted bundle number is not between the lower-limit bundle number and the upper-limit bundle number of the register rename instruction, zero is outputted.

The first bundle number calculator 13 performs an operation of subtracting the selection result of the first selector 12 from the bundle number stored in the control register 18.

When the inputted bundle number is between the lower-limit bundle number and the upper-limit bundle number, and the bundle number calculated by the first bundle number calculator 13 is smaller than the lower-limit bundle number of the register rename instruction, the AND circuit 16 outputs "1". In other cases, the circuit outputs "0".

The second selector 15 outputs "0", when the output of the AND circuit 16 is "0". When the output of the AND circuit 16 is "1", the selector outputs a value (To−From+1) obtained by subtracting the lower-limit bundle number from the upper-limit bundle number of the register rename instruction and adding "1" to the subtraction result.

The third selector 19 selects the bundle number calculated by the second bundle number calculator 17 during execution of the register rename instruction. During execution of other instructions, the bundle number stored in the control register 18 is selected.

When the register rename instruction is issued, the fourth selector 20 temporarily initializes the control register 18. In other cases, the selector selects the bundle number selected by the third selector 19 as it is. During initialization, the inputted bundle number is stored in the control register 18 as it is.

Here, the control register 18 corresponds to a reset part, and the second bundle number calculator 17 and third selector 19 correspond to a control register setting part.

A processing operation of the renaming apparatus of FIG. 15 will be described hereinafter as one example of the register rename instruction. In the example, as shown in FIG. 16, a lower-limit bundle number "From" is 3, an upper-limit bundle number "To" is b, and a rotation amount Shift is 3. The bundle number of the physical address is stored in the control register of FIG. 16.

The renaming apparatus of FIG. 15 performs processing operations in four cases in which: (1) rotation information is set; (2) a rotation instruction is not executed; (3) the rotation instruction is executed, and the designated bundle number is between the lower-limit bundle number and the upper-limit bundle number; and (4) the rotation instruction is executed, and the designated bundle number is not between the lower-limit bundle number and the upper-limit bundle number.

Figure 16A:
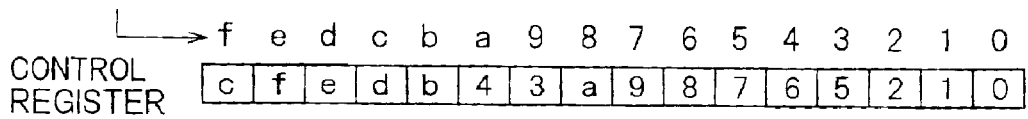
FIG. 16 is a diagram showing a value of a control register.
Figure 16B:
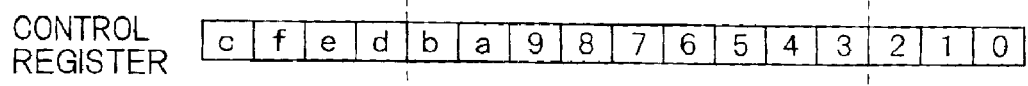

First, the processing operation at the time when the rotation information is set will be described. When the rotation instruction is issued, the fourth selector 20 initializes the content of the control register 18 before execution of the rotation operation. More specifically, the logical register number is set equal to the physical register number with respect to the bundles in the range in which the rotation is performed. With respect to the bundles in other ranges, the value of the control register 18 is not changed. As a result, as shown in FIG. 16B, the bundle number of the logical address agrees with the bundle number of the physical address.

The processing operation at the time when the rotation instruction is not executed will next be described. In this case, since the third selector 19 selects the bundle number stored in the control register 18, data of the control register 18 does not change.

The processing at the time when the rotation instruction is executed, and the original bundle number is not between the lower-limit bundle number and the upper-limit bundle number (bundle numbers 0 to 2 and c to f of FIG. 16) will next be described. In this case, the first selector 12 outputs "0", and the first bundle number calculator 13 outputs the bundle number stored in the control register 18 as it is. Moreover, since the output of the first judging section 11 is "0", the output of the AND circuit 16 becomes zero, and the fourth selector 20 outputs "0".

Figure 16C:
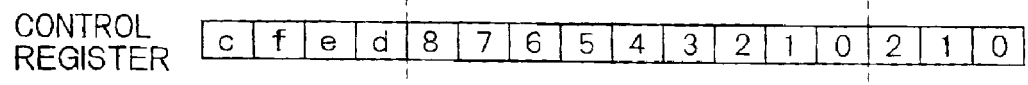

The processing operation in the case in which the rotation instruction is executed, and the original bundle number is between the lower-limit bundle number and the upper-limit bundle number will next be described. In this case, the first judging section 11 outputs "1", the first selector 12 outputs "3", and the first bundle number calculator 13 outputs a value obtained by subtracting "3" from the bundle number stored in the control register 18. The output of the first bundle number calculator 13 is obtained as shown in FIG. 16C.

The second judging section 14 outputs "0" when the bundle number calculated by the first bundle number calculator 13 is any one of "0", "1", and "2", and outputs "1" in other cases.

When the second judging section 14 outputs "0", the second selector 15 outputs a value (11−3+1=9) obtained by adding "1" to the value obtained by subtracting the lower-limit bundle number "3" from the upper-limit bundle number "b". When the second judging section 14 outputs "1", the second selector 15 outputs "0".

Figure 16D:
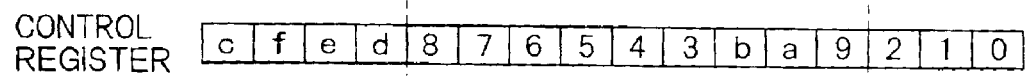

When the bundle number calculated by the first bundle number calculator 13 has values of "0", "1" and "2", the second bundle number calculator 17 outputs "9", "a" and "b" obtained by adding "9" to the respective output values of the first bundle number calculator. Moreover, when the bundle numbers calculated by the first bundle number calculator 13 are "3" to "8", the numbers are outputted as they are. Thereby, the content of the control register 18 is obtained as shown in FIG. 16D.

Thus, when executing the register rename instruction in the second embodiment, after the bundle in the rotation range is initialized, the rotation of the bundle is performed by hardware based on a rotation amount, lower-limit bundle number, and upper-limit bundle number of the register rename instruction. Therefore, the new bundle number can be set without exchanging data among the bundles. Therefore, the wiring extended over the bundles is unnecessary, thereby reducing the amount of the wiring and realizing a high-speed processing.

When the renaming apparatus of FIG. 15 is incorporated inside the processor, the renaming apparatus is preferably operated in accordance with movement of the pipeline. FIG. 17 is a block diagram showing an operation state of the renaming apparatus for allowing the processor to perform a pipeline operation. In this example, the content of the bundle is rotated for four cycles.

The renaming apparatus of FIG. 17 is composed of similarly as the apparatus of FIG. 15, except that a register file 21 for synchronization with each stage of the pipeline is disposed. The circuit processing can be simplified similarly as FIG. 15, and the high-speed processing can be realized.

The renaming apparatus of FIG. 17 is synchronized with the system clock in the register file 21 disposed inside the apparatus as described above. Even when the number of gate stages is large, timing is guaranteed, operation is stabilized, and it is possible to easily speed-up a clock speed.

What is claimed is:

1. A renaming apparatus configured to set a correspondence between a physical register number and a logical register number, said apparatus comprising:

a control register configured to store the correspondence between the physical register number and the logical register number; and a control register setting part configured to set said control register in accordance with the content of an instruction, when an instruction for setting the correspondence between the physical register number and the logical register number is included in the issued string of instructions, wherein said control register comprises first, second and third register sections, and said control register setting part associates the physical register number with the logical register number based on the content of said first register section, writes the result into said second register section, and subsequently writes the content of said second register section into said first and third register sections.

2. The renaming apparatus according to claim 1 wherein the instruction for setting the correspondence includes:

an instruction for associating the physical register number with the logical register number based on the content of said first register section, and writing the result into said second register section; and an instruction for writing the content of said second register section into said first and third register sections.

3. The renaming apparatus according to claim 2, further comprising:

a storage part configured to store the correspondence between the physical register number and the logical register number based on the content of said third register section.

4. The renaming apparatus according to claim 3 wherein said control register setting part stores the correspondence between the logical register number and the physical register for each of the banks including said plurality of logical registers.

5. The renaming apparatus according to claim 3 wherein said control register setting part stores the correspondence between the physical register number and the logical register number for each of the banks including said plurality of physical registers.

6. A renaming apparatus for setting a correspondence between a physical register number and a logical register number, said apparatus comprising:

a control register configured to store the correspondence between the physical register number and the logical register number for each of a plurality of banks, each of the banks including a plurality of physical registers or logical registers;

a reset part configured to reset the content of said control register corresponding to the bank indicated by a correspondence changing instruction for changing the correspondence between the physical register number and the logical register number for each of the banks, when the issued instructions include the correspondence changing instruction; and a control register setting part configured to set a new value to said reset control register based on information relating to a type of the bank for changing the correspondence and information regarding a change amount of the correspondence indicated by the correspondence changing instruction.

7. A renaming apparatus for setting a correspondence between a physical register number and a logical resister number, said apparatus comprising:

a control register configured to store the correspondence between the physical register number and the logical register number for each of a plurality of banks, each of the banks including a plurality of physical registers or logical registers;

a reset part configured to reset the content of said control register corresponding to the bank indicated by a correspondence changing instruction for changing the correspondence between the physical register number and the logical register number for each of the banks, when the issued instructions include the correspondence changing instruction; and a control register setting part configured to set a new value to said reset control register based on information relating to a type of the bank for changing the correspondence and information regarding a change amount of the correspondence indicated by the correspondence changing instruction.

wherein the correspondence changing instruction indicates a rotation amount of said bank indicating the change amount of the correspondence, and a lower-limit bank and an upper-limit bank which are rotated.

8. The renaming apparatus according to claim 7, further comprising:

a first judging part configured to judge whether or not a pre-designated original bank number is included between the lower-limit bank and the upper-limit bank indicated by the correspondence changing instruction;

a first selector configured to set a rotation amount of the bank based on a judgment result of said first judging part;

a first bank number calculator configured to calculate a new bank number corresponding to said original bank number;

a second judging part configured to judge whether or not said calculated new bank number is smaller than the bank number of the lower-limit bank indicated by the correspondence changing instruction;

a second selector configured to select a correction value of the bank number based on the judgment result of said second judging part;

a second bank number calculator configured to add the bank number calculated by said bank number calculator and the correction value selected by said second selector to calculate a final bank number; and a third selector configured to select either of the bank number calculated by said first bank number calculator or the bank number stored in said control register, wherein said reset part initializes the content of said control register based on said original bank number before rotating the bank number in a case in which the correspondence changing instruction is issued, and stores the bank number selected by said third selector in said control register in other cases.

9. The renaming apparatus according to claim 8 wherein:

said first selector outputs the rotation amount indicated by the correspondence changing instruction in a case in which said original bank number is judged to be included between the lower-limit bank and the upper-limit bank indicated by the correspondence changing instruction, and outputs zero in other cases, said second selector selects the correction value based on a lower-limit bank number and an upper-limit bank number indicated by the correspondence changing instruction, when said first judging part judges said original bank number to be included between the lower-limit bank and the upper-limit bank, and said second judging part judges the original bank number to be smaller than the bank number of the lower-limit bank, and said third selector selects the bank number calculated by said second bank number calculator after said correspondence changing instruction is issued, until a new bank number is stored in said control register, and selects the bank number stored in said control register in other cases.

10. A processor which has a renaming function of a register and which performs software pipelining, comprising:

a control register configured to store the correspondence between the physical register number and the logical register number for each of a plurality of banks, each of the banks including a plurality of physical registers or logical registers;

a reset part configured to reset the content of said control register corresponding to the bank indicated by a correspondence changing instruction for changing the correspondence between the physical register number and the logical register number for each of the banks, when the issued instructions include the correspondence changing instruction; and a control register setting part configured to set a new value to said reset control register based on information relating to a type of the bank for changing the correspondence and information regarding a change amount of the correspondence indicated by the correspondence changing instruction, wherein access to a memory is performed based on the physical register number set to said control register.

11. The processor according to claim 10, further comprising:

a first judging part configured to judge whether or not a pre-designated original bank number is included between the lower-limit bank and the upper-limit bank indicated by the correspondence changing instruction;

a first selector configured to set a rotation amount of the bank based on a judgment result of said first judging part;

a first bank number calculator configured to calculate a new bank number corresponding to said original bank number;

a second judging part configured to judge whether or not said calculated new bank number is smaller than the bank number of the lower-limit bank indicated by the correspondence changing instruction;

a second selector configured to select a correction value of the bank number based on the judgment result of said second judging part;

a second bank number calculator configured to add the bank number calculated by said bank number calculator and the correction value selected by said second selector to calculate a final bank number; and a third selector configured to select either of the bank number calculated by said first bank number calculator or the bank number stored in said control register, wherein said reset part initializes the content of said control register based on said original bank number before rotating the bank number in a case in which the correspondence changing instruction is issued, and stores the bank number selected by said third selector in said control register in other cases; and wherein said reset part, said control register setting part, said first judging part, said first selector, said first bank number calculator, said second judging part, said second selector, said second bank number calculator, and said third selector perform respective processings in synchronism with an operation of a pipeline of the processor.

12. The processor according to claim 11 which includes a register file for synchronizing the processing of said renaming apparatus with the pipeline operation of the processor.

* * * * *